United States Patent
Smirnov et al.

(10) Patent No.: US 10,324,911 B1
(45) Date of Patent: Jun. 18, 2019

(54) STORAGE SYSTEM WITH BUCKET CONTENTS REBALANCER PROVIDING ADAPTIVE PARTITIONING FOR DATABASE BUCKETS

(71) Applicant: Virtustream IP Holding Company LLC, Bethesda, MD (US)

(72) Inventors: Andrey Smirnov, Moscow (RU); Artem Chernyshev, Moscow (RU); Ming Zhang, Stoughton, MA (US); Braden Gibson, Riverview, FL (US)

(73) Assignee: Virtustream IP Holding Company LLC, Bethesda, MD (US)

(*) Notice: Subject to any disclaimer, the term of this patent is extended or adjusted under 35 U.S.C. 154(b) by 279 days.

(21) Appl. No.: 15/281,964

(22) Filed: Sep. 30, 2016

(51) Int. Cl.
  *G06F 16/215*   (2019.01)
  *G06F 16/22*    (2019.01)
  *G06F 16/2455*  (2019.01)

(52) U.S. Cl.
  CPC ........ *G06F 16/215* (2019.01); *G06F 16/2255* (2019.01); *G06F 16/2282* (2019.01); *G06F 16/24554* (2019.01)

(58) Field of Classification Search
  None
  See application file for complete search history.

(56) References Cited

U.S. PATENT DOCUMENTS

| | | | |
|---|---|---|---|
| 2008/0215544 A1* | 9/2008 | Galindo-Legaria | G06F 17/30321 |
| 2009/0089334 A1* | 4/2009 | Mohamed | G06F 17/30339 |
| 2009/0150336 A1* | 6/2009 | Basu | G06F 17/30595 |
| 2012/0079484 A1* | 3/2012 | Shoolman | G06F 17/30607 718/100 |

(Continued)

FOREIGN PATENT DOCUMENTS

WO  2013123449 A1  8/2013

OTHER PUBLICATIONS

"Wide Column Stores", published by solid IT gmbh on Sep. 15, 2015, retrieved via the Internet Archive Wayback Machine on Aug. 21, 2018, from https://web.archive.org/web/20150915172031/https://db-engines.com/en/article/Wide+Colunnn+Stores (Year: 2015).*

*Primary Examiner* — Alex Gofman
*Assistant Examiner* — Umar Mian
(74) *Attorney, Agent, or Firm* — Ryan, Mason & Lewis, LLP

(57) ABSTRACT

An apparatus in one embodiment comprises a storage system that includes a database. A controller associated with the storage system is configured to perform rebalancing of bucket contents tables for respective buckets of the database where each such bucket contains a plurality of objects stored within the database. A given one of the bucket contents tables for a particular one of the buckets comprises a plurality of rows each associated with a different hash key. The given bucket contents table further comprises a plurality of columns each associated with multiple objects stored within the database. Each such object has a corresponding object key and is associated with a particular entry of the bucket contents table that includes metadata for that object. The controller illustratively performs the rebalancing of the given bucket contents table using adaptive partitioning of object key ranges associated with respective rows of the given bucket contents table.

20 Claims, 19 Drawing Sheets

(56) References Cited

U.S. PATENT DOCUMENTS

| | | | |
|---|---|---|---|
| 2013/0218840 A1* | 8/2013 | Smith | G06F 11/1446 707/639 |
| 2013/0332608 A1* | 12/2013 | Shiga | G06F 9/5088 709/226 |
| 2013/0339314 A1* | 12/2013 | Carpentier | G06F 3/0641 707/692 |
| 2016/0147750 A1* | 5/2016 | Blanco | G06F 17/30324 707/747 |
| 2016/0171064 A1* | 6/2016 | Gupta | G06F 17/30592 707/602 |
| 2017/0277726 A1* | 9/2017 | Huang | G06F 17/30303 |

* cited by examiner

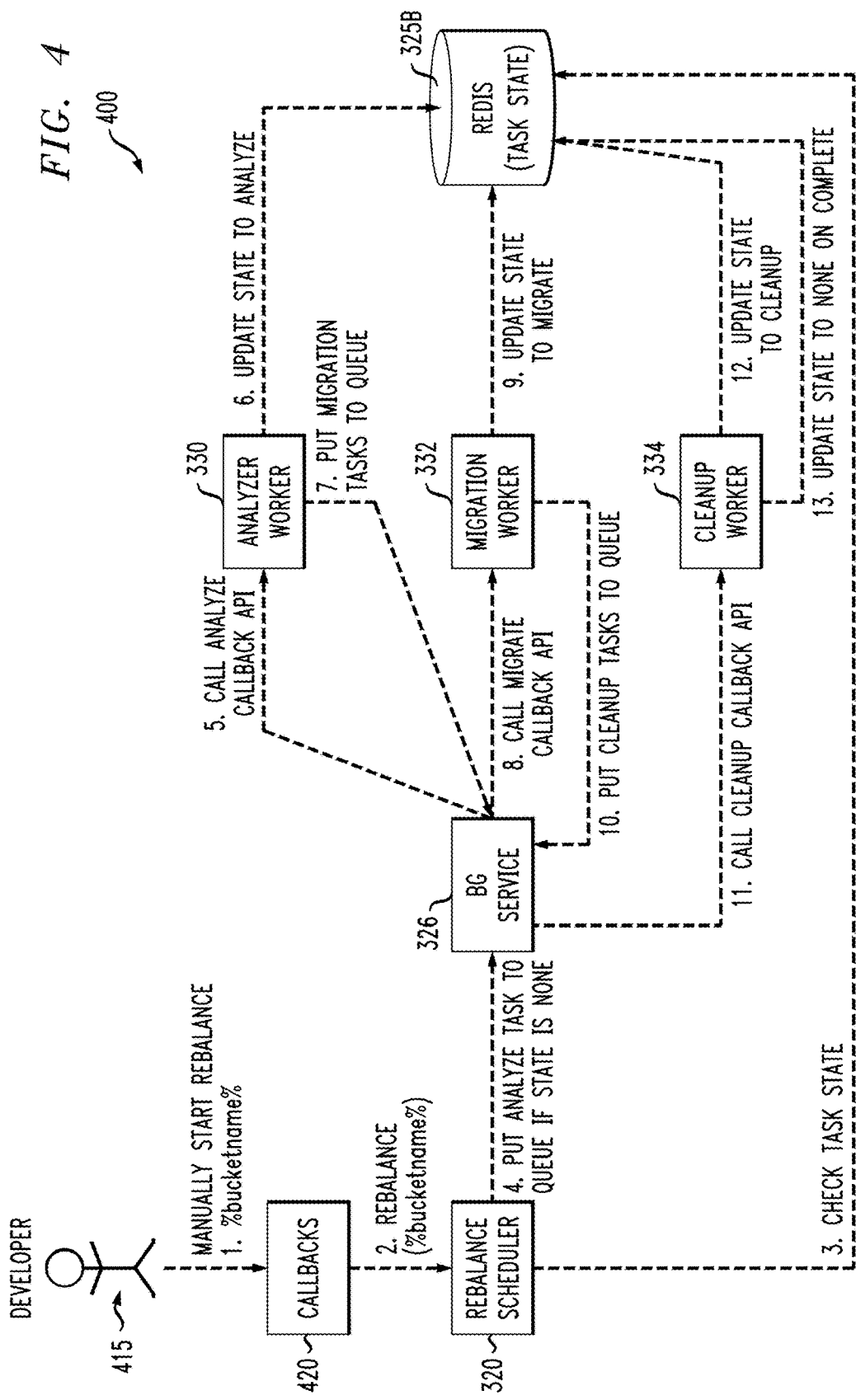

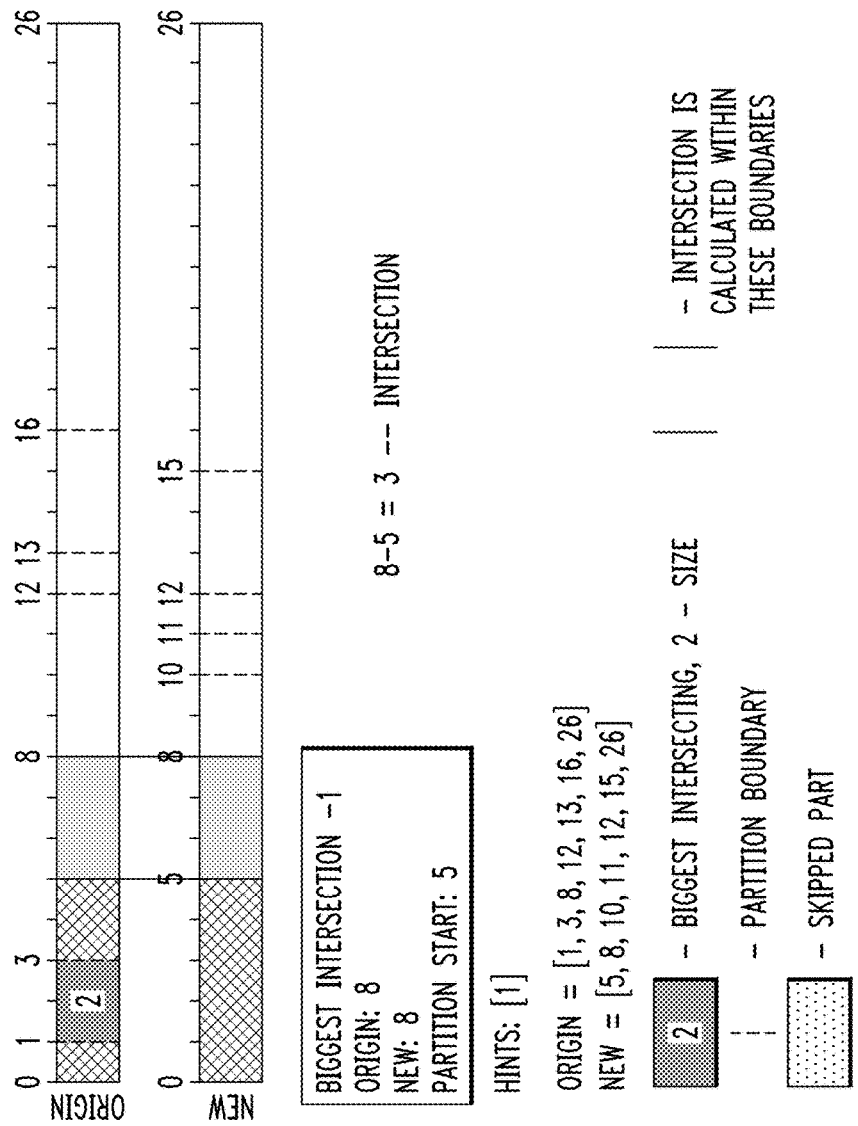

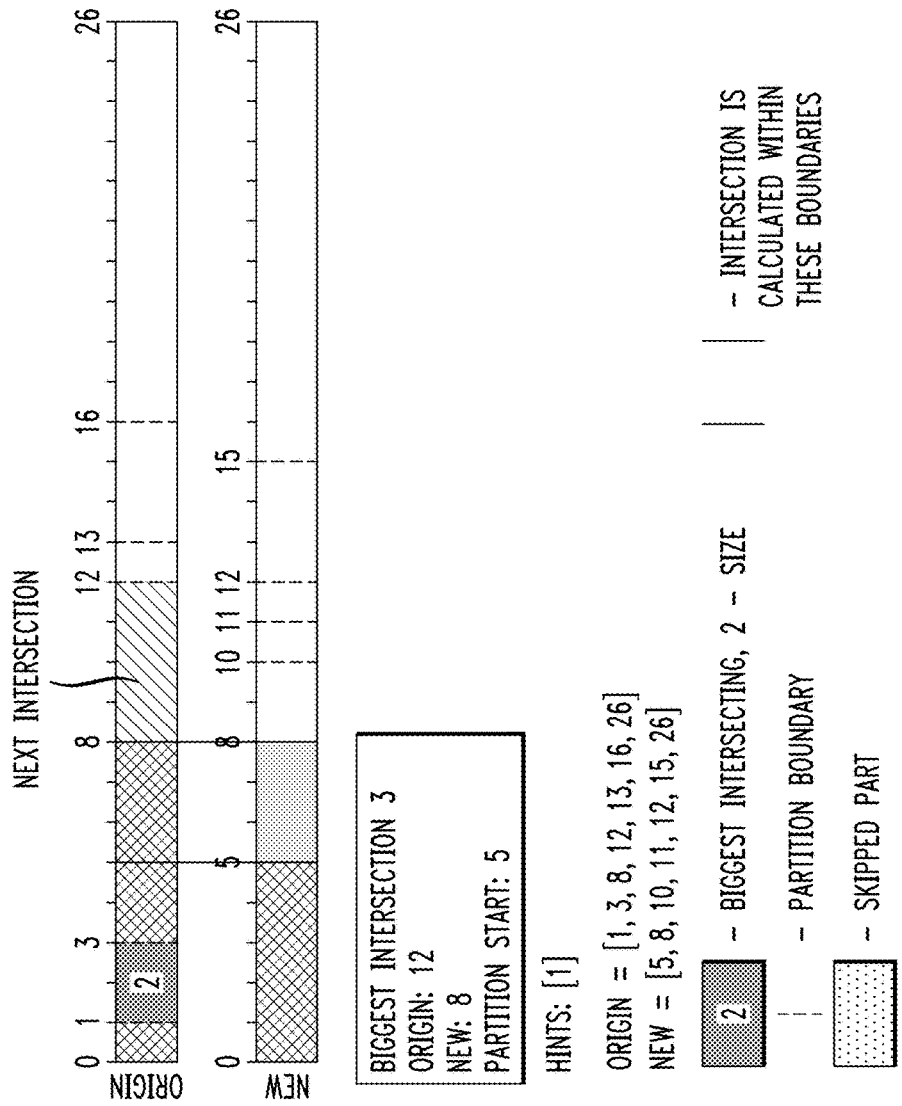

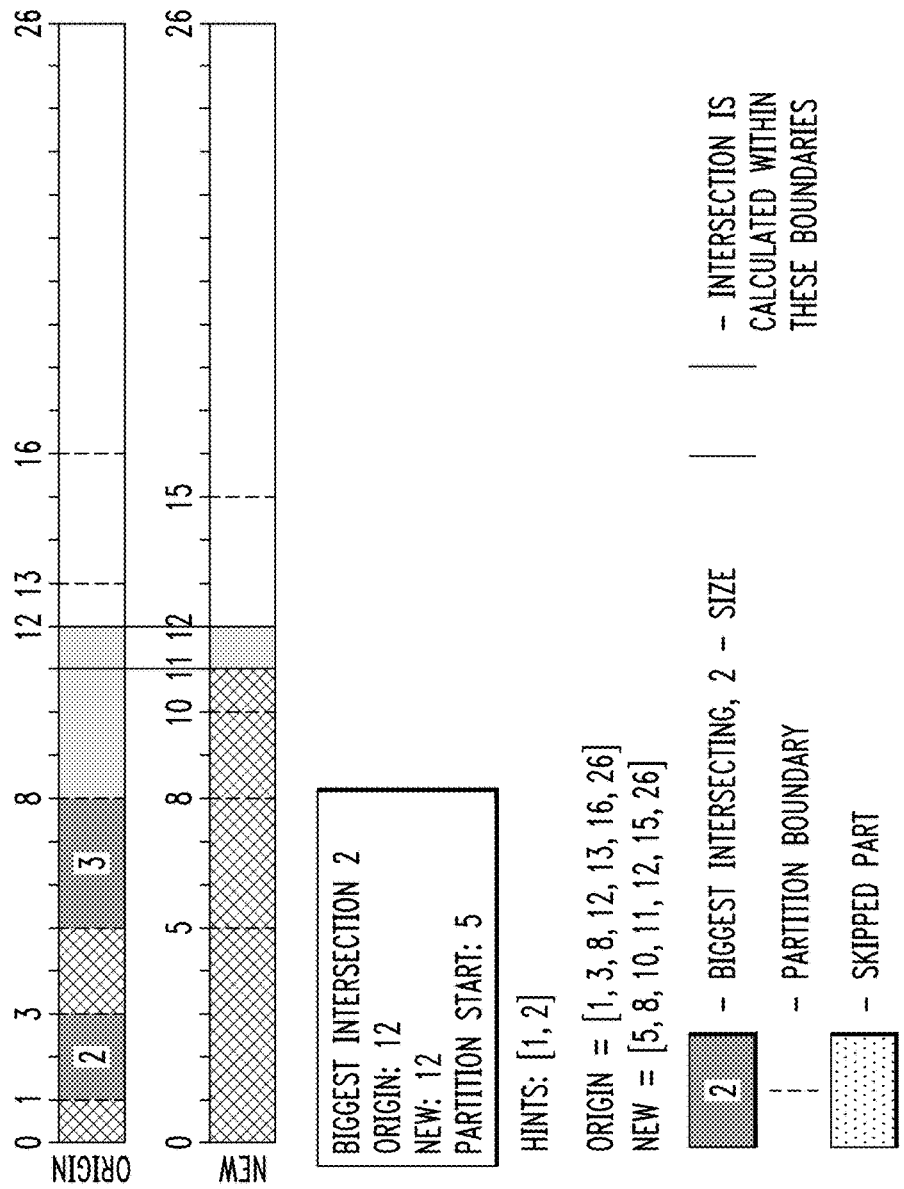

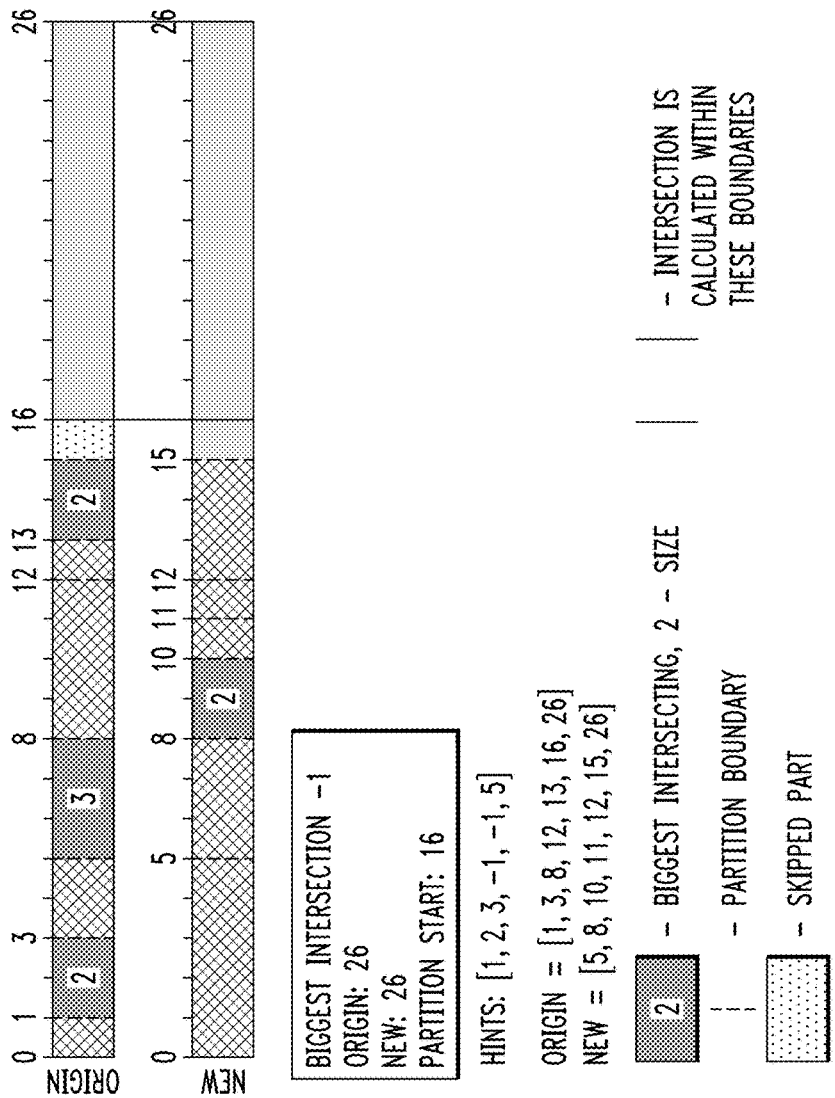

STORAGE SYSTEM WITH BUCKET CONTENTS REBALANCER PROVIDING ADAPTIVE PARTITIONING FOR DATABASE BUCKETS

FIELD

The field relates generally to information processing systems, and more particularly to storage management in information processing systems.

BACKGROUND

Information processing systems are often configured to implement storage systems comprising distributed databases adapted for object storage. A given such distributed database may be configured to utilize bucket-based data structures to store metadata for multiple objects of variable size.

For example, in an Apache Cassandra distributed database, each bucket typically corresponds to a single row of a bucket contents table, and the columns of the table correspond to respective objects associated with that bucket. The row of the table has a particular hash key. Each of the objects has a unique object key that identifies its corresponding column of the table. The table entry for that column contains metadata for the object, with such metadata further characterizing the manner in which the object is stored within the storage system. The object keys of the bucket contents table are generally arranged in sorted order within the single row for the corresponding bucket so as to support rapid access.

Unfortunately, conventional storage system arrangements of this type are problematic in that the bucket contents table size can grow unduly large as the number of objects associated with the bucket increases.

SUMMARY

Illustrative embodiments of the present invention provide storage systems that implement bucket contents rebalancers for databases such as Apache Cassandra distributed databases. For example, a given such bucket contents rebalancer is advantageously configured to distribute bucket contents over multiple rows of a bucket contents table with each such row having a different hash key. The bucket contents rebalancer illustratively utilizes adaptive partitioning of the object key ranges associated with respective rows of the bucket contents table based on a genetic algorithm or other suitable algorithm. Such an arrangement can easily and efficiently scale to billions of objects within a single bucket for a limited row size while still supporting rapid access to object keys in sorted order.

In one embodiment, an apparatus comprises a storage system that includes a database. A controller implemented in or otherwise associated with the storage system is configured to perform rebalancing of bucket contents tables for respective buckets of the database wherein each such bucket contains a plurality of objects stored within the database. A given one of the bucket contents tables for a particular one of the buckets of the database comprises a plurality of rows each associated with a different hash key. The given bucket contents table further comprises a plurality of columns each associated with multiple objects stored within the database. Each such object has a corresponding object key and is associated with a particular entry of the bucket contents table that includes metadata for that object. The controller is configured to perform the rebalancing of the given bucket contents table using adaptive partitioning of object key ranges associated with respective rows of the given bucket contents table.

In some embodiments, the database comprises a distributed database implemented as a cluster of Cassandra nodes. Other types of databases and storage systems can be used in other embodiments.

The adaptive partitioning of the object key ranges illustratively analyzes a current distribution of object keys across the rows of the given bucket contents table and determines a new distribution of the object keys. This may involve at least one of adding one or more new rows to the given bucket contents table and deleting one or more existing rows from the given bucket contents table.

For example, the adaptive partitioning in some embodiments can involve splitting a single existing object key range into two or more new object key ranges, merging two or more existing object key ranges into a single new object key range, or a combination of such splitting and merging. The adaptive partitioning is illustratively performed in a manner that preserves a sorted order of the object keys within the given bucket contents table.

The controller may be configured to perform the rebalancing of the given bucket contents table using a distribution table that is representative of the given bucket contents table. Such a distribution table illustratively comprises rows corresponding to respective ones of a plurality of hash keys and a column denoting final ones of the object keys for respective ones of the object key ranges corresponding to respective ones of the plurality of hash keys. Other types of tables can be used in other embodiments.

The controller may be further configured to maintain per-bucket activity counters for respective ones of a plurality of buckets of the database with each per-bucket activity counter counting a number of objects added to or removed from the corresponding bucket since a previous adaptive partitioning of its bucket contents table. In such an arrangement, the adaptive partitioning may be triggered for the given bucket contents table based at least in part on its corresponding per-bucket activity counter exceeding a specified threshold.

As noted above, illustrative embodiments can provide significant advantages over conventional arrangements. For example, these embodiments avoid the unduly large table sizes that would otherwise result when using conventional techniques to process increasingly large numbers of objects.

These and other illustrative embodiments disclosed herein include, without limitation, apparatus, systems, methods, and computer program products comprising processor-readable storage media.

BRIEF DESCRIPTION OF THE DRAWINGS

FIG. 4 illustrates an example of a bucket contents rebalancing process that can be performed using the rebalancer of FIG. 3.

FIGS. 5A-5M and 6A-6E illustrate examples of different aspects of a bucket contents rebalancing process based on a genetic algorithm.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources.

Figure 1:
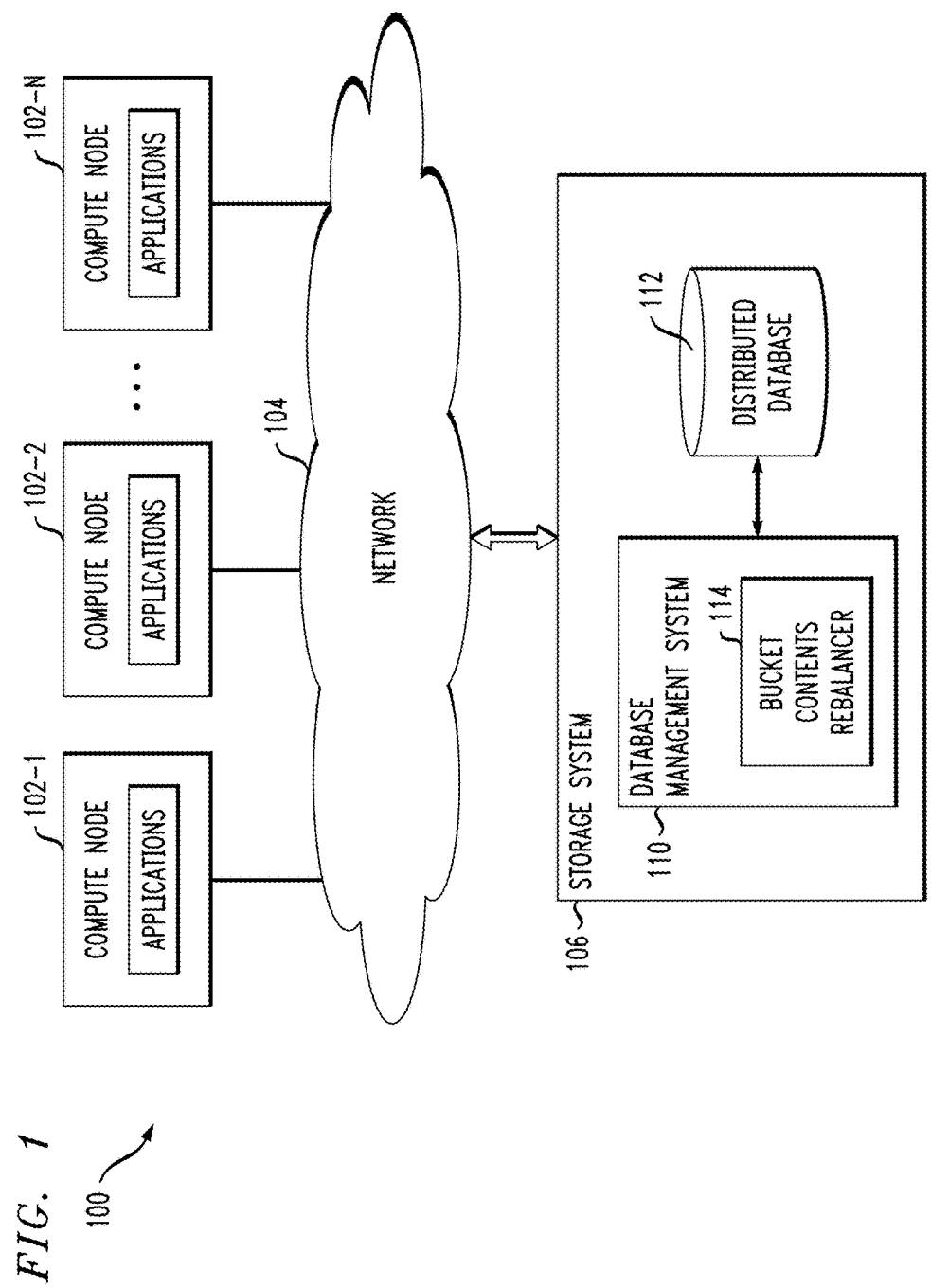
FIG. 1 is a block diagram of an information processing system comprising a storage system that implements a bucket contents rebalancer using adaptive partitioning in an illustrative embodiment of the invention.

FIG. 1 shows an information processing system 100 configured in accordance with an illustrative embodiment of the present invention. The information processing system 100 comprises compute nodes 102-1, 102-2, . . . 102-N that implement respective sets of applications as shown. The compute nodes 102 communicate over a network 104 with a storage system 106. The storage system 106 comprises storage resources that are accessible to the applications of the compute nodes 102.

The storage system 106 has an associated controller configured to perform rebalancing of bucket contents tables using adaptive partitioning. In this embodiment, the controller is implemented in the form of a database management system 110 that controls access of the compute node applications to a database 112 which is implemented in the form of a distributed database, although it is to be appreciated that a wide variety of other types of controllers and databases can be used in other embodiments.

It is assumed that the database 112 comprises a plurality of buckets. Each such bucket contains a plurality of objects stored within the database. Moreover, each of at least a subset of the buckets has a corresponding bucket contents table that is maintained by a bucket contents rebalancer 114 of the database management system 110.

A given one of the bucket contents tables for a particular one of the buckets of the database 112 comprises a plurality of rows each associated with a different hash key, and a plurality of columns each associated with multiple objects stored within the database. Each such object has a corresponding object key and is associated with a particular entry of the bucket contents table that includes metadata for that object.

The bucket contents rebalancer 114 is configured to perform the rebalancing of the given bucket contents table using adaptive partitioning of object key ranges associated with respective rows of the given bucket contents table. The adaptive partitioning of the object key ranges in some embodiments utilizes a genetic algorithm, although other types of algorithms can be used in other embodiments.

The adaptive partitioning of the object key ranges illustratively analyzes a current distribution of object keys across the rows of the given bucket contents table and determines a new distribution of the object keys. The new distribution may involve at least one of adding one or more new rows to the given bucket contents table and deleting one or more existing rows from the given bucket contents table.

In some embodiments, the bucket contents rebalancer 114 is further configured to maintain per-bucket activity counters for respective ones of the buckets of the database. Each such per-bucket activity counter counts a number of objects added to or removed from the corresponding bucket since a previous adaptive partitioning of its bucket contents table. The adaptive partitioning can be triggered for the given bucket contents table based at least in part on its corresponding per-bucket activity counter exceeding a specified threshold. Different thresholds may be used for different types of database buckets.

Additional processes performed in conjunction with bucket contents rebalancing include an object migration process and a clean-up process. The object migration process is performed within the database in order to implement a new distribution of object keys across the rows of the given bucket contents table. The clean-up process is performed on the given bucket contents table subsequent to completion of the object migration process and removes extraneous information elements from the table.

In some embodiments, the bucket contents rebalancer 114 is configured to perform the rebalancing of the given bucket contents table using adaptive partitioning of object key ranges by splitting a single existing object key range into two or more new object key ranges, merging two or more existing object key ranges into a single new object key range, or by a combination of such splitting and merging.

Moreover, the rebalancing of the given bucket contents table using adaptive partitioning of object key ranges is illustratively performed in a manner that preserves a sorted order of the object keys within the given bucket contents table.

As will be described in more detail below, the bucket contents rebalancer 114 in some embodiments performs the rebalancing of the given bucket contents table using a distribution table that is representative of the given bucket contents table. Such a distribution table illustratively comprises rows corresponding to respective ones of a plurality of hash keys and a column denoting final ones of the object keys for respective ones of the object key ranges corresponding to respective ones of the plurality of hash keys.

The bucket contents rebalancing in illustrative embodiments can advantageously ensure that the given bucket contents table has a specified maximum row size but can nonetheless accommodate a number of objects that is one or more orders of magnitude greater than the specified maximum row size. Accordingly, such embodiments can avoid the unduly large table sizes that would otherwise result when using conventional techniques to process increasingly large numbers of objects.

Additional examples of bucket contents rebalancing techniques that may be implemented by the database management system 110 utilizing its bucket contents rebalancer 114 are shown in FIGS. 2 through 6.

The bucket contents rebalancer 114 is illustratively shown as a module of the database management system 110, but in other embodiments can comprise a separate stand-alone component of the storage system 106, or can be implemented in another component of the storage system 106, such as internally to the database 112.

As indicated previously, the database management system 110 comprising bucket contents rebalancer 114 is one example of what is more generally referred to as a "controller" associated with the storage system 106. Although this particular controller is shown as being arranged as an internal component of the storage system 106, this is for purposes of illustration only, and other embodiments can include a controller that is implemented at least in part externally to an associated storage system.

In some embodiments, the database 112 comprises a distributed database implemented as a cluster of Cassandra nodes providing fault tolerance by replicating stored data across multiple ones of the nodes. For example, Cassandra nodes can be configured to implement asynchronous masterless replication providing automatic data distribution across all nodes that are part of a given cluster. As a result, if there is a failure of any node in the cluster, replicated data from that node is available on one or more other nodes in the cluster. Cassandra replication is generally designed to provide high availability with no single point of failure. It is to be appreciated, however, that use of Cassandra nodes is only an example, and other types of distributed or non-distributed databases can be used in other embodiments. The Cassandra nodes may also be viewed as representative examples of what are also referred to herein as "storage nodes" of a distributed storage system.

Cassandra databases of the type described above generally store data for each partition in a sorted manner by object key. This allows the bucket contents as reflected by the list of object keys to be accessed in sorted order from any given point corresponding to a particular object key or prefix.

Bucket contents rebalancing techniques disclosed herein can involve, for example, splitting a given partition into multiple smaller partitions. In these and other similar rebalancing situations, the techniques maintain sorted order within each partition and the partitions do not overlap. Accordingly, the ability to access the bucket contents in sorted order from any given point is maintained after the rebalancing.

The above-described bucket contents rebalancing functionality in the present embodiment is implemented primarily by the bucket contents rebalancer 114 of the database management system 110. The database management system 110 is assumed to incorporate additional functionality typically included in such a component. Such additional functionality relating to management of database 112 is of a type well-known to those skilled in the art and is therefore not described in further detail herein. For example, the database management system 110 can comprise a conventional database management system, suitably modified to incorporate bucket contents rebalancing functionality as disclosed herein.

The compute nodes 102 in some embodiments are implemented by respective virtual machines of cloud infrastructure. For example, such nodes can be implemented using processor and memory components of the virtual machines.

Examples of cloud infrastructure that can be used in some embodiments include public clouds provided by a cloud-based system such as the Amazon Web Services (AWS) system. Other examples of cloud-based systems that can be used to provide virtual machines for implementing compute nodes 102 and possibly other portions of system 100 include Google Cloud Platform (GCP) and Microsoft Azure.

The storage system 106 is illustratively configured to implement at least one file system for data stored by or on behalf of the compute nodes 102. Such a file system may comprise a parallel file system, a distributed file system or combinations of multiple file systems of potentially different types.

In some embodiments, the storage system 106 comprises a software-defined storage pool accessible to the compute nodes 102. Such a software-defined storage pool can be implemented using software-defined storage products such as ScaleIO™ or ViPR® both of which are commercially available from EMC Corporation of Hopkinton, Mass. Accordingly, shared resources of a software-defined storage pool are considered examples of storage resources as that term is broadly used herein.

The storage system 106 may illustratively comprise multiple distinct storage tiers, such as a fast tier and a capacity tier, although such multiple storage tiers are not explicitly shown in the figure. By way of example, the storage system 106 may illustratively comprise a 2 TIERS™ storage system from EMC Corporation, with the fast tier implemented using DSSD™ server-based flash storage devices and the capacity tier comprising one or more object stores. Storage resources can illustratively comprise objects stored in one or more such storage tiers of storage system 106. Numerous other types of storage resources such as blocks, files or other data items can be used in other embodiments.

The information processing system 100 can be implemented utilizing processing devices of one or more processing platforms. Such processing devices can be interconnected with one another using high-speed connections. For example, data can be moved between processing devices of the system 100 using remote direct memory access (RDMA) connections over InfiniBand or Gigabit Ethernet. Numerous other types of connections and associated data transfer protocols can be used in other embodiments.

It is to be appreciated that these and other features of illustrative embodiments are presented by way of example only, and should not be construed as limiting in any way.

Accordingly, different numbers, types and arrangements of compute nodes, networks, storage systems, databases and controllers for providing bucket contents rebalancing for database buckets can be used in other embodiments.

For example, the storage system 106 can illustratively comprise one or more storage platforms. A given such storage platform can comprise any of a variety of different types of storage including network-attached storage (NAS), storage area networks (SANs), direct-attached storage (DAS) and distributed DAS, as well as combinations of these and other storage types, including the above-noted software-defined storage.

A given storage platform may comprise storage arrays such as VNX® and Symmetrix VMAX® storage arrays, both commercially available from EMC Corporation. Other types of storage products that can be used in implementing a given storage platform in an illustrative embodiment include the previously-mentioned software-defined storage products such as ScaleIO™ and ViPR®, and server-based flash storage devices such as DSSD™, as well as cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage platform in an illustrative embodiment.

These and other storage platforms can be part of what is more generally referred to herein as a processing platform comprising one or more processing devices each comprising a processor coupled to a memory. A given such processing device may correspond to one or more virtual machines or other types of virtualization infrastructure such as Docker containers or other types of Linux containers (LXCs). The controller illustratively comprising database management system 110 and bucket contents rebalancer 114, as well as other system components, may be implemented at least in part using processing devices of such processing platforms.

For example, a given controller as disclosed herein can be implemented in one or more LXCs running on respective virtual machines or other types of processing devices of a given processing platform.

Communications between the various elements of system 100 take place over one or more networks including the network 104. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of FIG. 2. The process as shown includes steps 200 through 210, and is suitable for use in the system 100 but is more generally applicable to other embodiments comprising a storage system having a bucket contents rebalancer providing adaptive partitioning for database buckets. The process is illustratively performed by a controller associated with the storage system, such as the database management system 110 comprising bucket contents rebalancer 114 in the FIG. 1 embodiment.

In step 200, per-bucket counters for respective buckets of a database are monitored in order to identify candidate buckets for rebalancing.

In step 202, a determination is made as to whether or not any candidate bucket has been identified. This determination is illustratively based on comparing the per-bucket counts of the respective buckets to a specified threshold. The same threshold may be used for all of the buckets. Alternatively, different thresholds may be used for respective different subsets of buckets of different types.

If no bucket has a per-bucket counter that is above its specified threshold, no candidate bucket is identified in step 202 and the process moves to step 204 to update the per-bucket counters responsive to objects being added to or removed from the corresponding buckets. The process then returns to step 200 to continue to monitor the updated per-bucket counters for candidate buckets.

If at least one bucket is determined to have a per-bucket counter that is above its specified threshold, that bucket is identified as a candidate bucket in step 202 and the process moves to step 206 as indicated. There may be more than one candidate bucket identified in step 202, in which case steps 206, 208 and 210 are repeated for each such candidate bucket. However, it will be assumed without limitation for further description of the FIG. 2 process that only a single candidate bucket is identified in step 202.

In step 206, the bucket contents table for the identified candidate bucket is rebalanced by adaptive partitioning of object key ranges associated with respective rows of the bucket contents table.

In step 208, object migration is performed in order to implement a new distribution of object keys across rows of the bucket contents table.

In step 210, clean-up of the bucket contents table is performed.

The process then moves to step 204 to update the bucket counters and subsequently returns to step 200 to continue to monitor the updated per-bucket counters for additional candidate buckets.

In addition, as-needed or periodic per-bucket counter updates can be performed by cycling between steps 200 and 204 without testing for candidate buckets in step 202. Accordingly, it is possible to perform additional counter updates in the FIG. 2 process without also executing step 202 for all such updates. This is indicated by the bidirectionality of the arrow connecting steps 200 and 204 in the figure.

Figure 2:
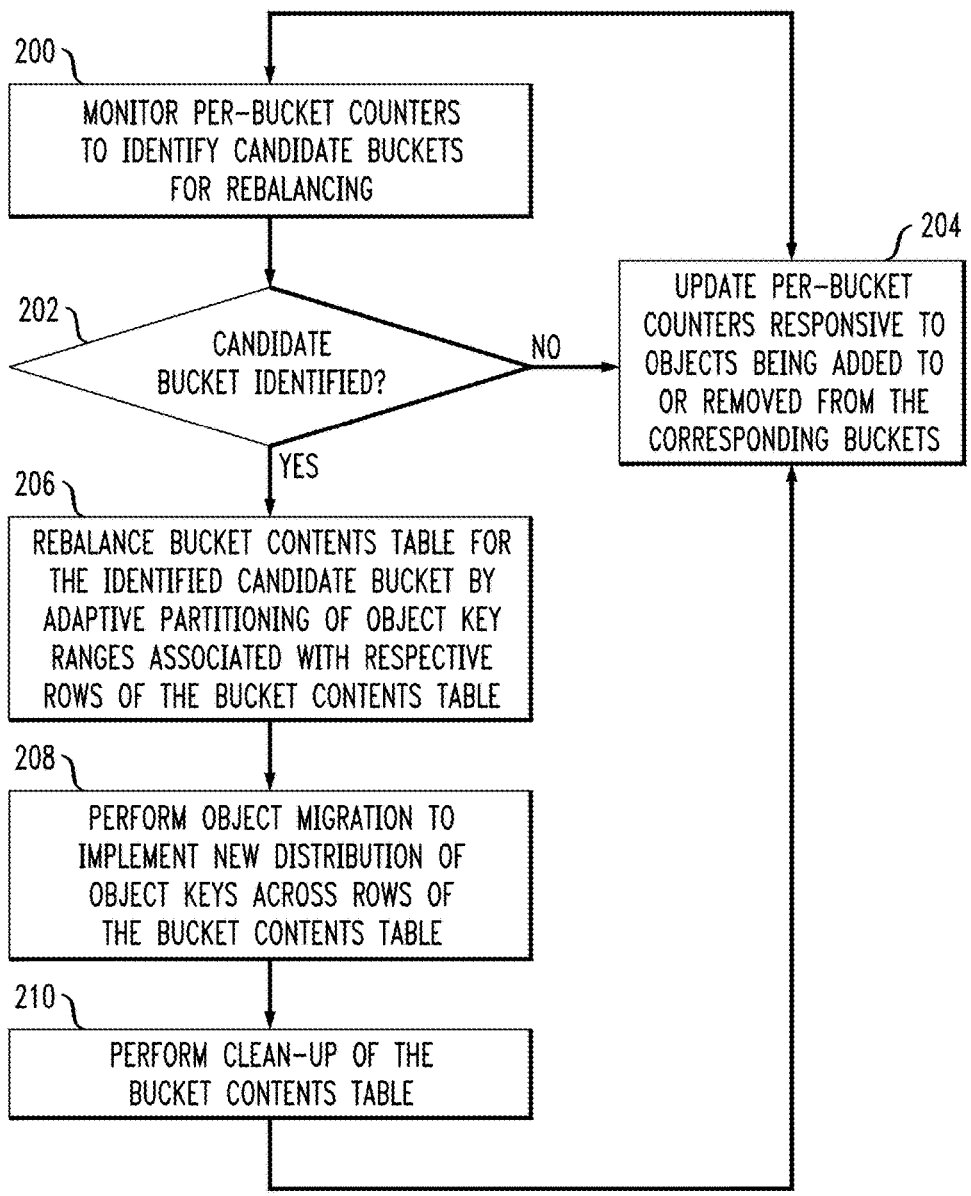
FIG. 2 is a flow diagram of a bucket contents rebalancing process using adaptive partitioning in an illustrative embodiment.

The particular processing operations and other system functionality described in conjunction with the flow diagram of FIG. 2 are presented by way of illustrative example only, and should not be construed as limiting the scope of the invention in any way. Alternative embodiments can use other types of processing operations involving a controller configured to provide bucket contents rebalancing for database buckets in a storage system. For example, the ordering of the process steps may be varied in other embodiments, or certain steps may be performed concurrently with one another rather than serially. Also, one or more of the process steps may be repeated periodically, or multiple instances of the process can be performed in parallel with one another for different storage systems or associated databases within a given information processing system.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments of bucket contents rebalancing techniques will now be described with reference to FIGS. 3 through 6. In each of these embodiments, a controller is configured to implement bucket contents rebalancing using adaptive partitioning for database buckets.

It is assumed without limitation for these illustrative embodiments that the embodiments are implemented in a storage system comprising a database and an associated controller configured to perform bucket contents rebalancing for buckets of the database using adaptive partitioning. The database is illustratively a distributed database such as distributed database comprising a cluster of Cassandra nodes.

Figure 3:
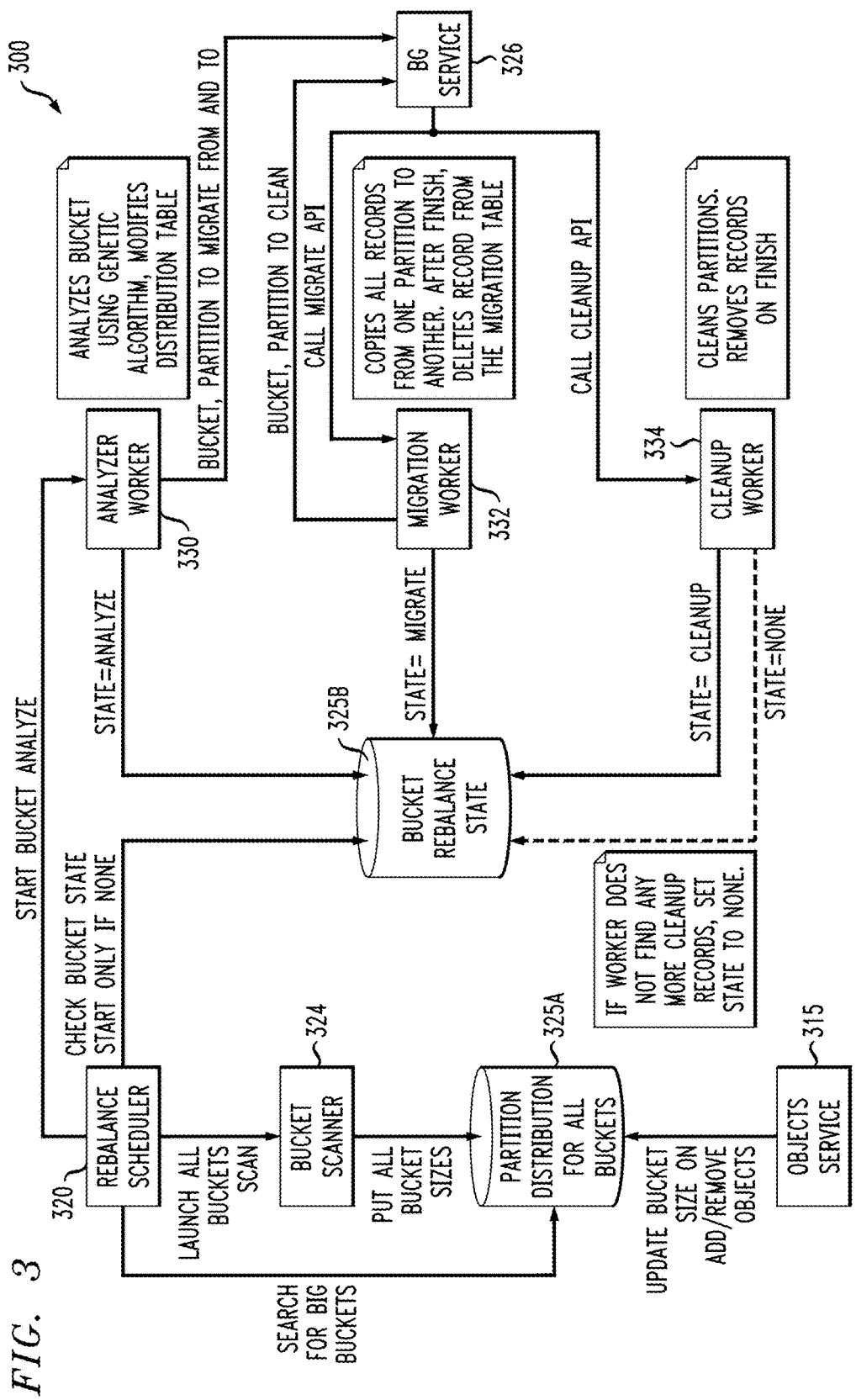
FIG. 3 shows a more detailed view of one possible implementation of a bucket contents rebalancer in an illustrative embodiment.
Figure 5A:
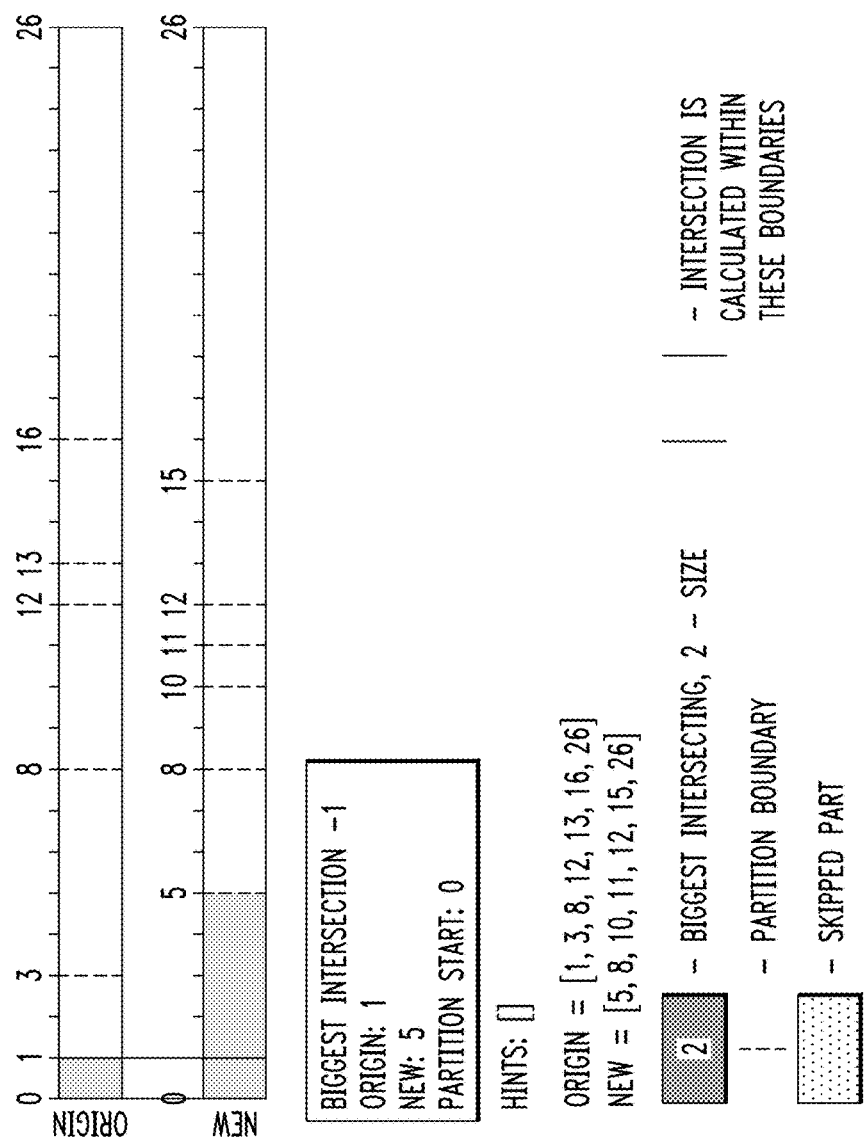
Figure 5B:
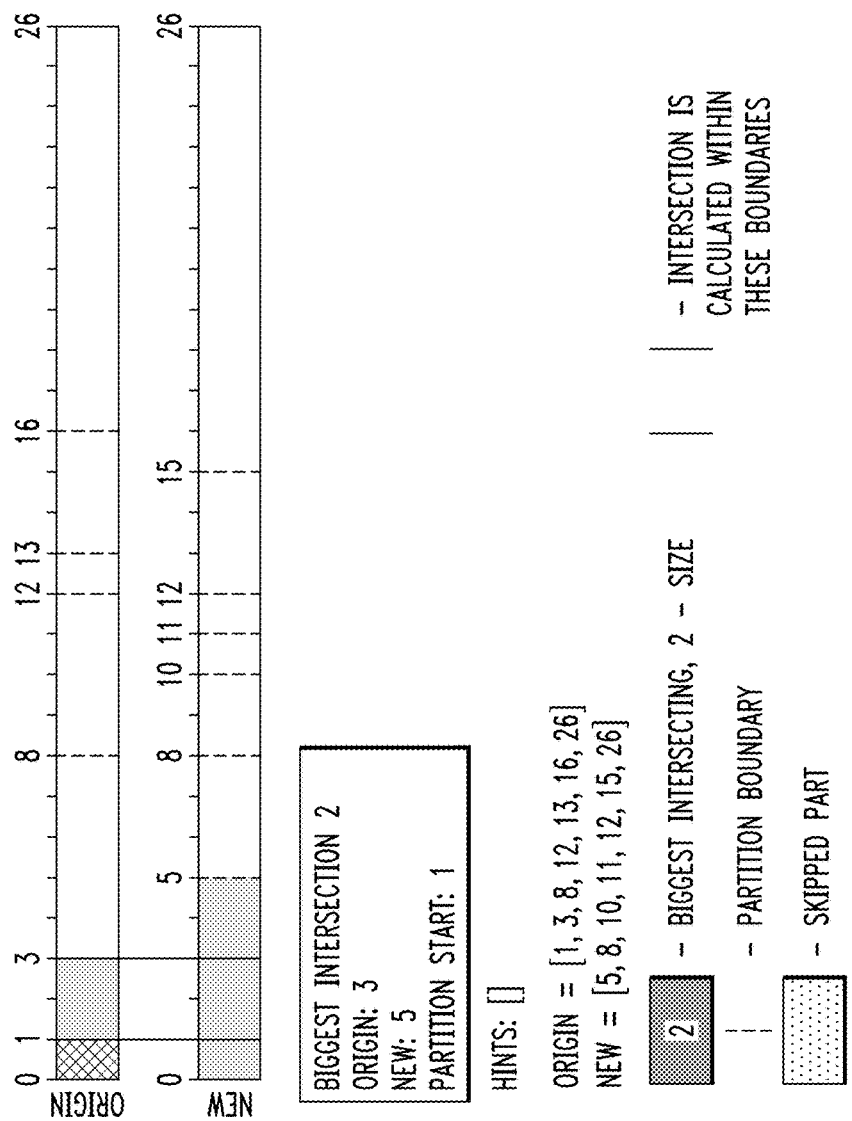
Figure 5C:
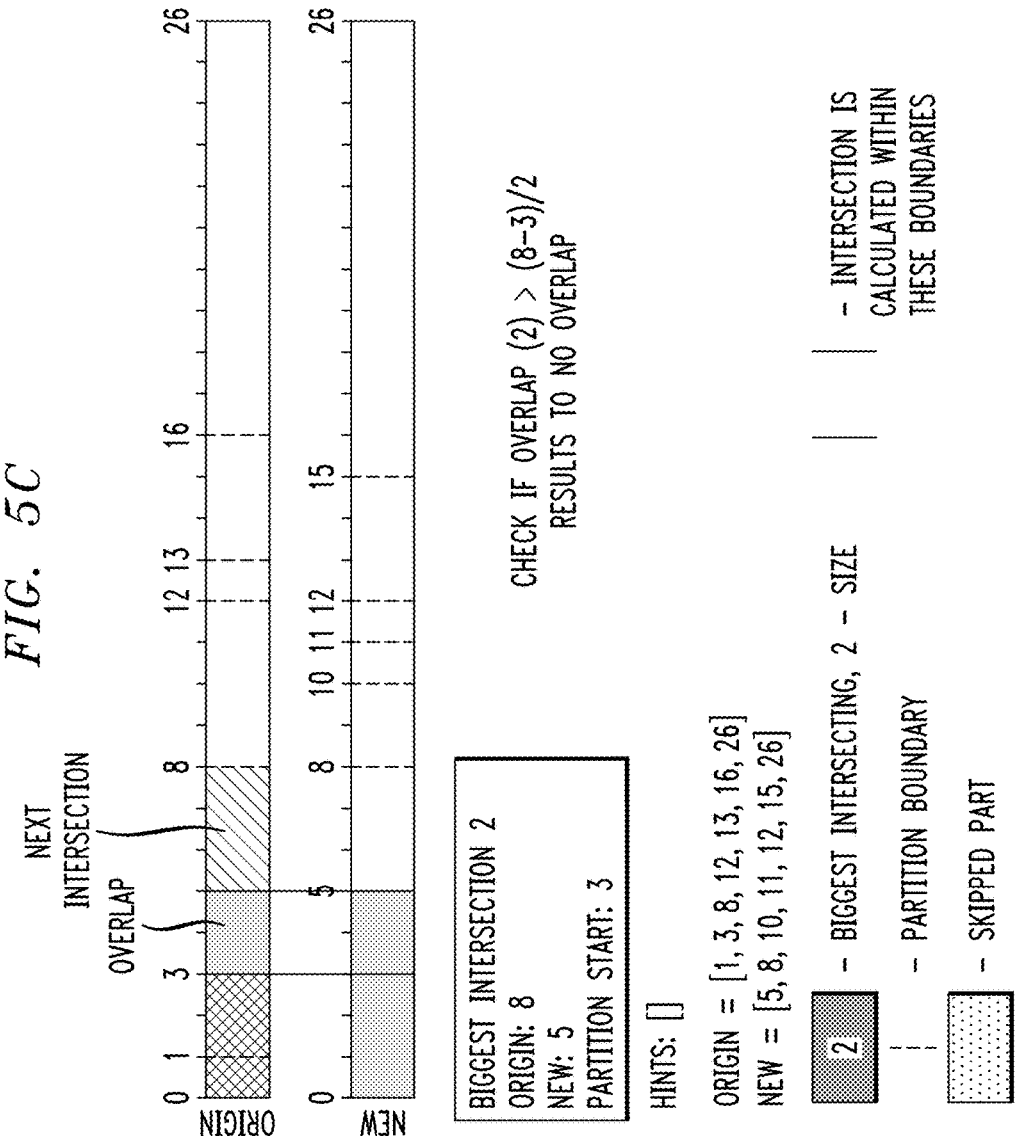
Figure 5D:
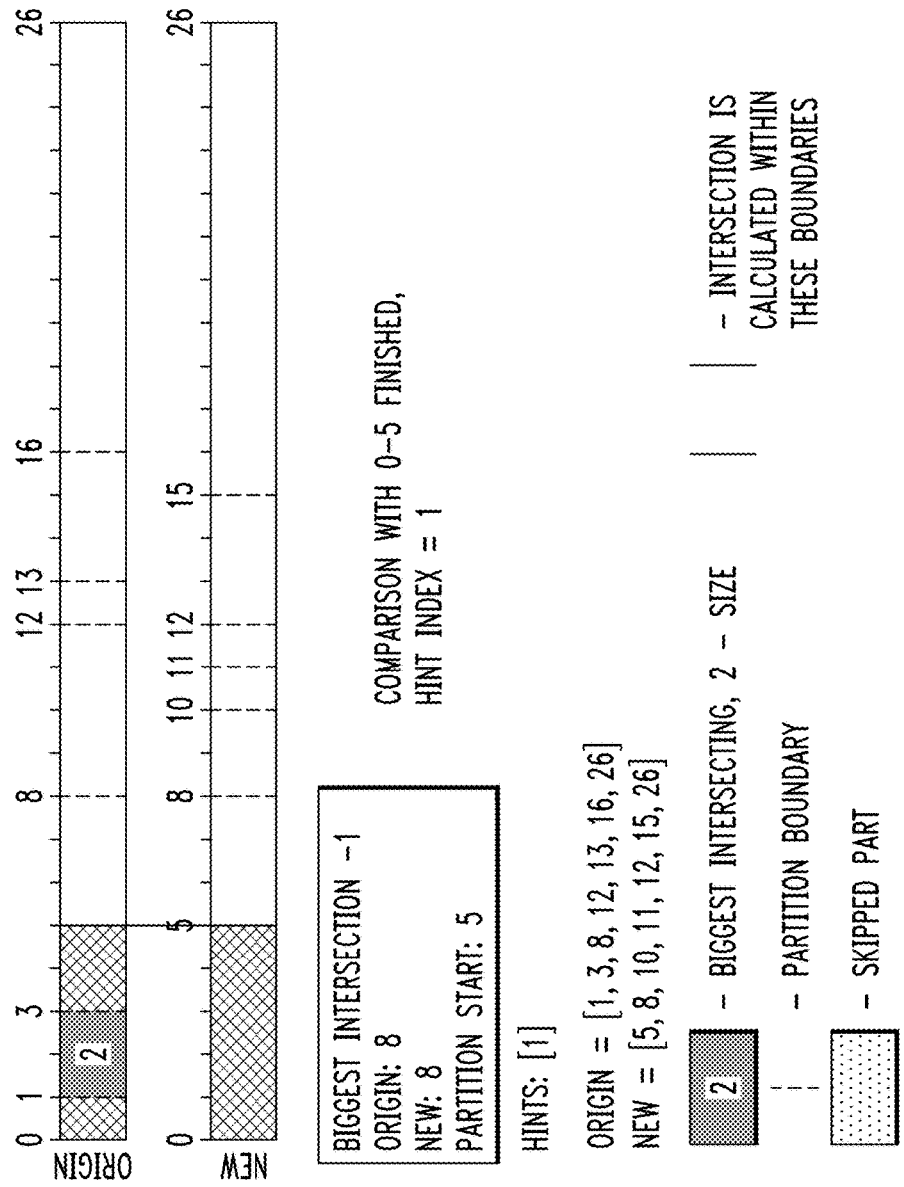
Figure 5G:
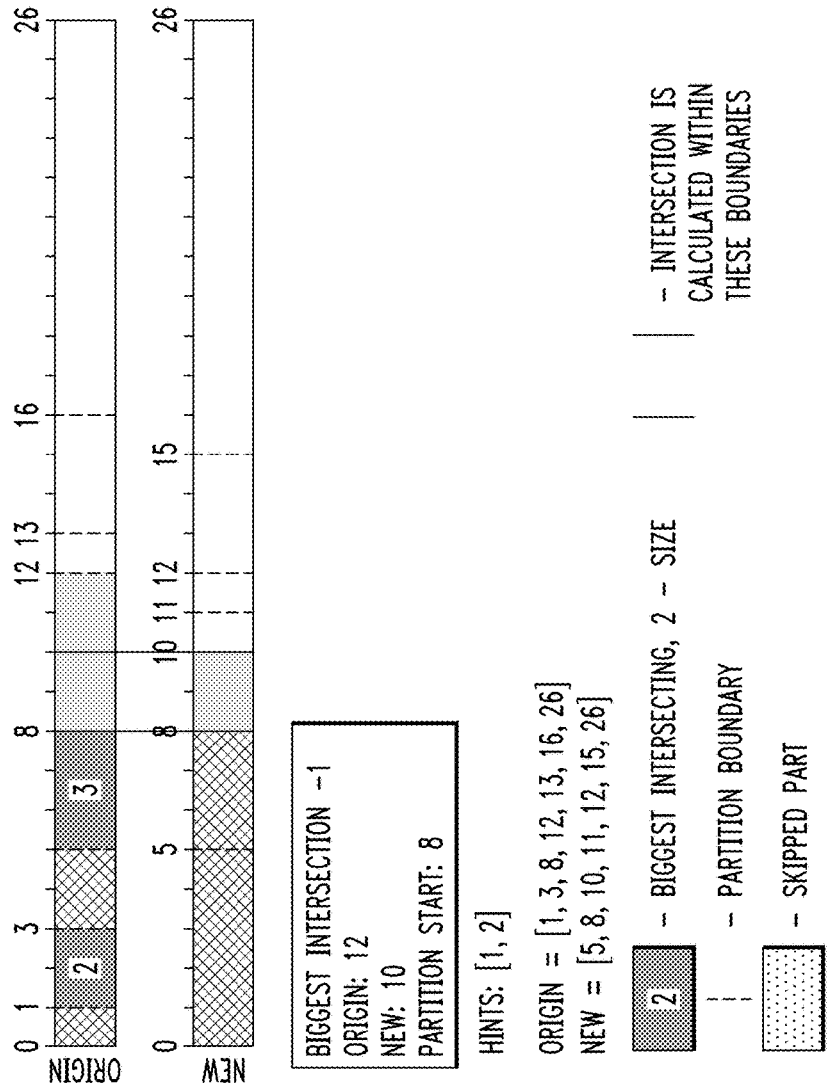
Figure 5H:
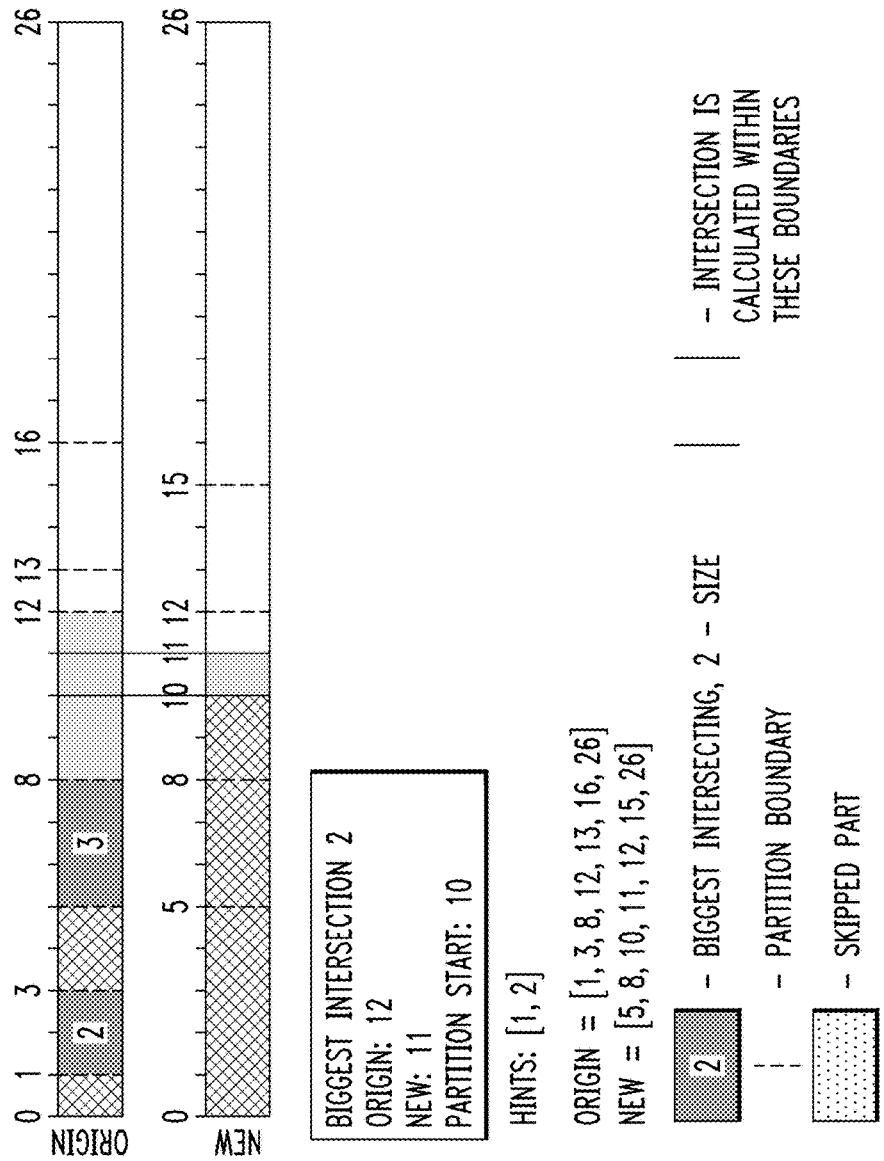
Figure 5J:
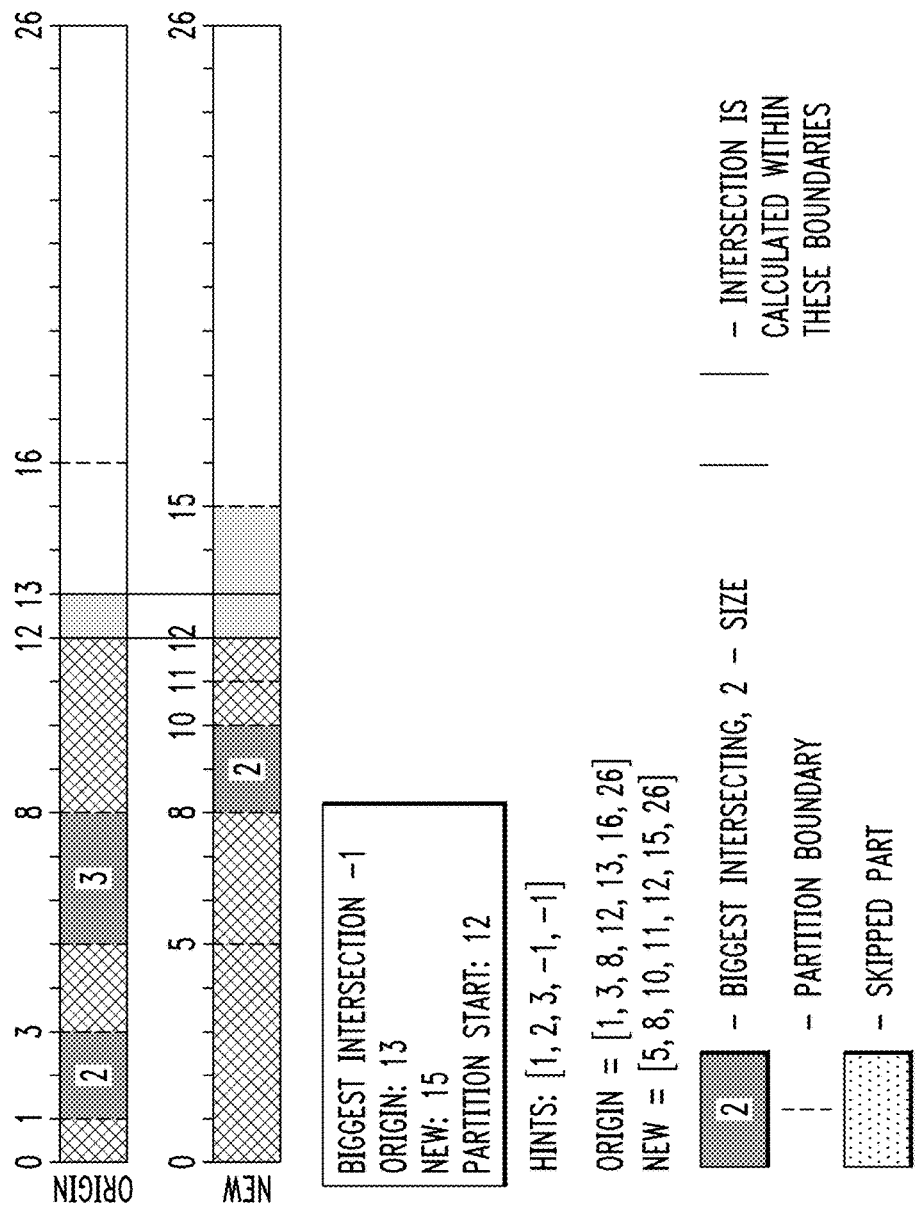
Figure 5K:
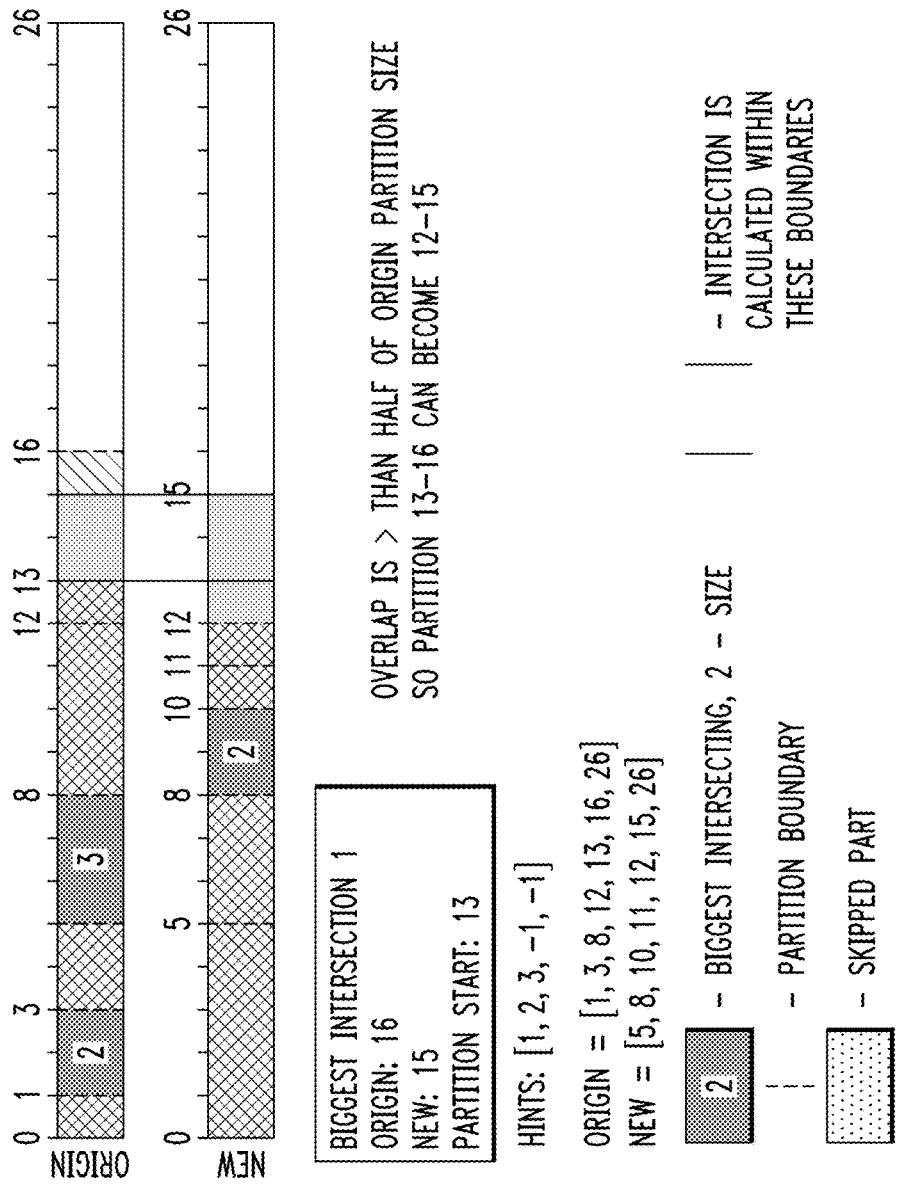
Figure 5M:
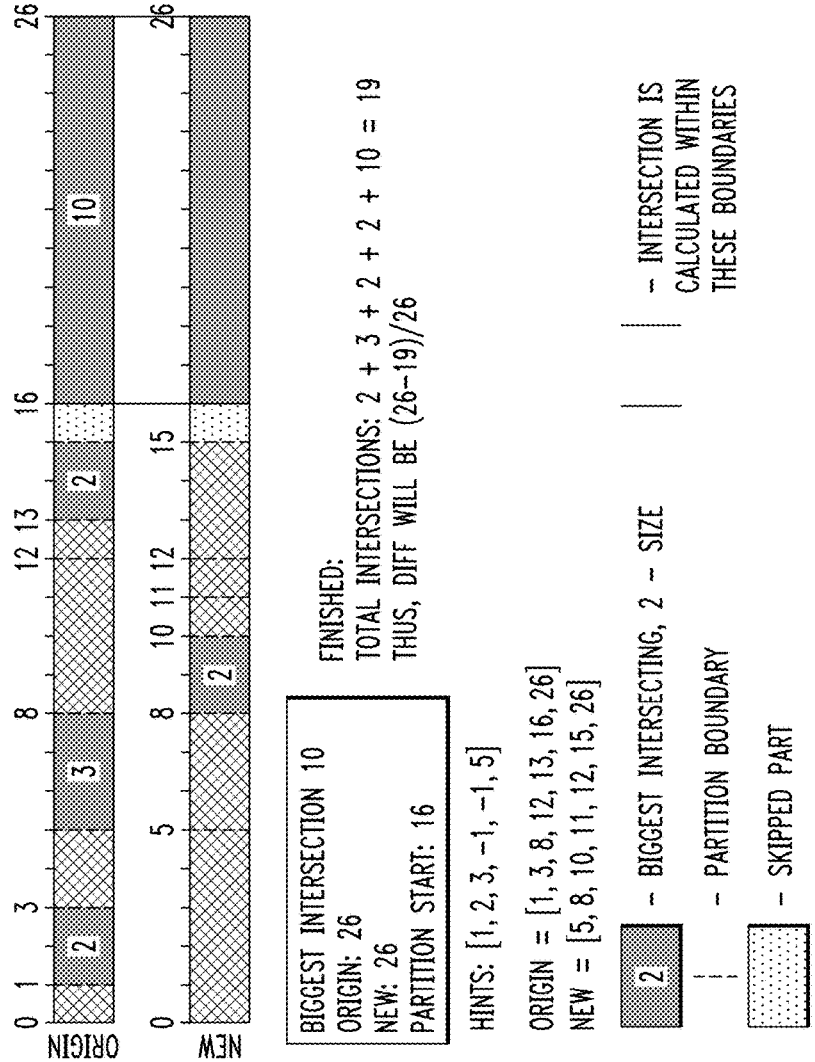
Figure 6A:
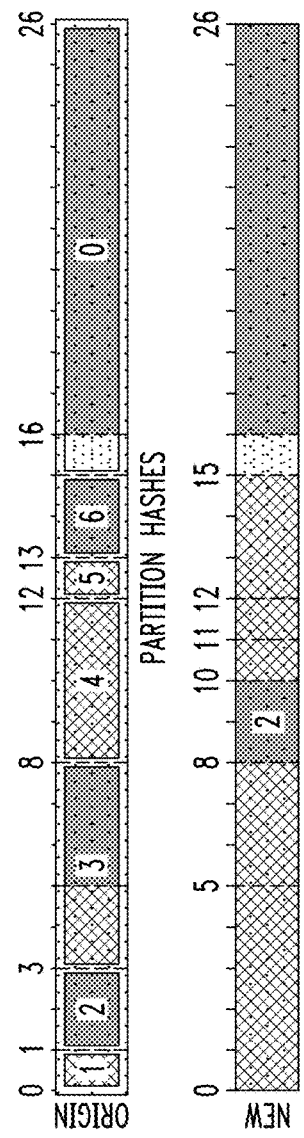
Figure 6B:
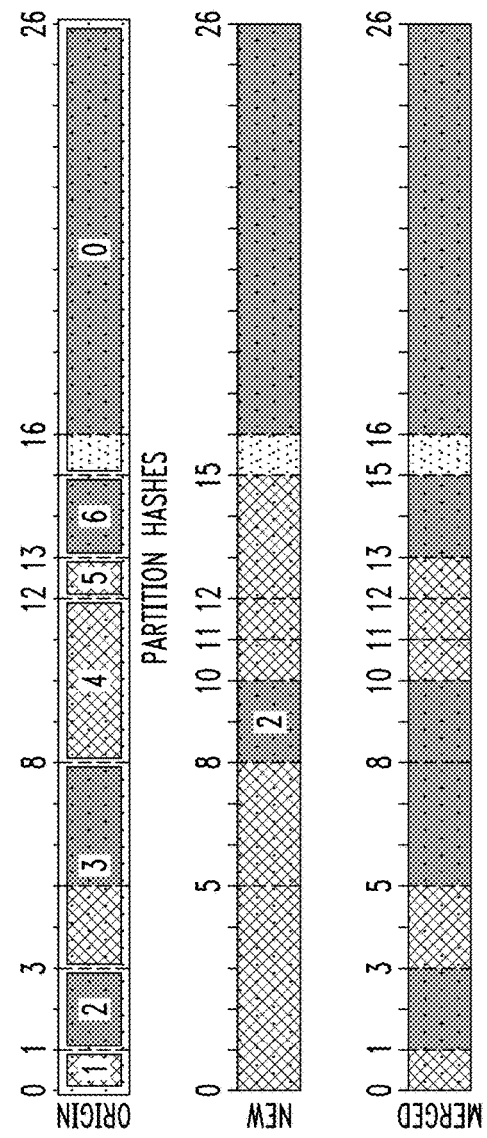
Figure 6C:
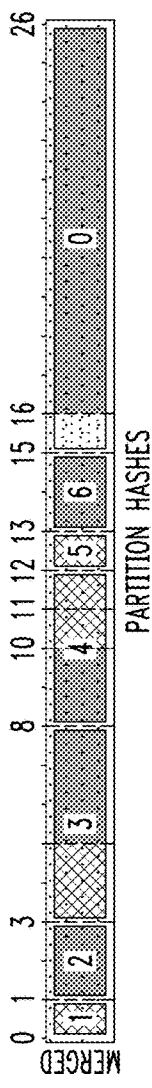
Figure 6D:
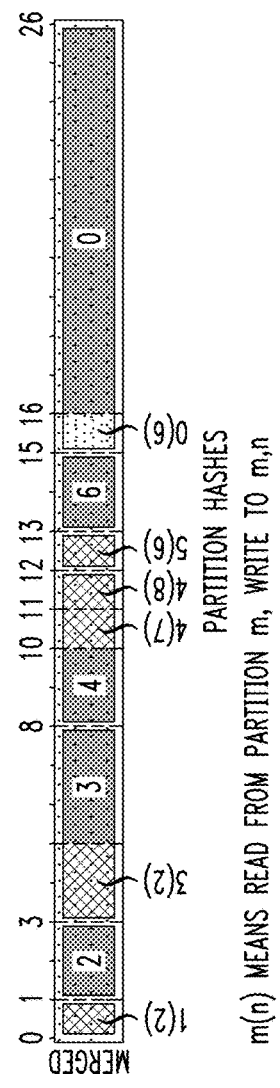
Figure 6E:
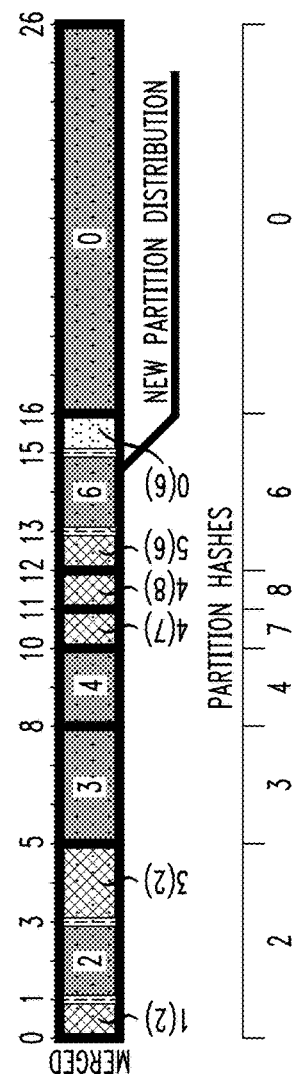

Referring now to FIG. 3, a storage system 300 having a database further comprises a bucket contents rebalancer that includes an objects service ("ObjectsService") 315, a rebalance scheduler 320 ("RebalanceScheduler"), a bucket scanner 324 ("BucketScanner"), and storage for redistribution information ("redis") comprising a first portion 325A that stores partition distribution for all buckets and a second portion 325B that stores bucket rebalance state information. The storage system 300 further comprises an analyzer worker 330 ("AnalyzerWorker"), a migration worker 332 ("MigrationWorker"), a clean-up worker 334 ("Cleanup-Worker") and a background ("BG") service 326.

The objects service 315 is operative to update bucket sizes for the database and to add objects to and remove objects from the buckets of the database.

The rebalance scheduler 320 is operative to launch scans of all buckets of the database using the bucket scanner 324. The bucket scanner 324 is also implemented as a worker similar to components 330, 332 and 334, and writes the bucket sizes and associated current partition distribution information to a partition distribution cache in the first portion 325A of the redistribution storage. The bucket scanner 324 can be started automatically by the rebalance scheduler 320 upon a first run or upon loss of the redistribution information due to a failure or other similar condition. Additionally or alternatively, it can be started periodically in accordance with a predetermined schedule, such as every n days, hours, etc. Numerous other types of scheduling may be used to activate the bucket scanner 324 to update the current partition distribution information for the database buckets.

The rebalance scheduler 320 utilizes the current partition distribution information in the first portion 325A of the redistribution storage in order to identify candidate buckets for rebalancing. These illustratively include "big buckets" in the current embodiment, which may be those buckets whose per-bucket counters exceed a specified threshold. The specified threshold in some embodiments is given by 100K*number of partitions, although other thresholds can be used in other embodiments. The per-bucket counter is reset when the corresponding bucket is subject to bucket contents rebalancing.

If the rebalance scheduler 320 identifies a candidate bucket for rebalancing, it first checks the bucket state in the bucket rebalance state portion 325B of the redistribution storage. For example, the rebalance scheduler 320 will not start a bucket rebalancing process for a given bucket if the bucket already has a bucket contents rebalancing process in progress. Upon determining that the candidate bucket does not already have a bucket contents rebalancing process in progress, the rebalance scheduler 320 starts a bucket contents rebalancing process by activating the analyzer worker 330 for the candidate bucket. This involves analyzing the current partition distribution of the candidate bucket using a genetic algorithm and modifying the corresponding distribution table to reflect an updated partitioning. The analyzer worker 330 provides a state=analyze indication to the bucket rebalance state portion 325B. It also calls the background service 326 with an identifier of the bucket being rebalanced and information characterizing the desired migration from the previous partition to the updated partition.

The background service 326 calls a migrate API of the migration worker 332. The migration worker 332 provides an updated state indication of state=migrate to the bucket rebalance state portion 325B, and copies all records from one partition to another as needed in order to implement the updated partition. This illustratively involves use of a migration table. The records in this embodiment illustratively comprise respective objects, although other types of records may be involved in other embodiments. Upon completion of the migration process, the migrated records are deleted from the migration table as indicated in the figure. The migration worker 332 then calls the background service 326 with an identifier of the bucket being rebalanced and the partition to be cleaned.

The background service 326 calls a clean-up API of the clean-up worker 334. The clean-up worker 334 provides an updated state indication of state=cleanup to the bucket rebalance state portion 325B, and cleans the partitions as appropriate, removing any extraneous records upon finish. After it is determined that there are no additional records to be cleaned up, the clean-up worker 334 updates the state information to state=none and the bucket contents rebalancing for the candidate bucket is complete.

The above-noted migrate and clean-up processes are illustratively configured to perform processing in batches each having an associated request. Accordingly, if it appears that a given migrate or clean-up request may take too long to complete, additional instances of the task can be put to the background service 326.

The bucket contents rebalancer in this embodiment is illustratively configured with service crash resiliency so as to be able to continue if is interrupted at any point during a bucket contents rebalancing process.

FIG. 4 illustrates an example of a bucket contents rebalancing process 400 that can be performed using the buckets content rebalancer of FIG. 3. The bucket contents rebalancing process 400 in this embodiment is initiated by a developer manually starting a rebalancing process for a particular one of the buckets (denoted "% bucketname %") via a callbacks service 420, although it is to be appreciated that the bucket contents rebalancing process 400 can alternatively be started in an automated manner based on per-bucket counters as in other embodiments.

Accordingly, in this embodiment, the storage system provides an API allowing developer 415 or another system user to force start rebalance for any specific bucket. The bucket contents rebalancing process 400 utilizes the rebalance scheduler 320, bucket rebalance state portion 325B, background service 326, analyzer worker 330, migration worker 332 and clean-up worker 334, all assumed to be configured as previously described in conjunction with FIG. 3. The bucket contents rebalancing process 400 includes the following steps:

1. User calls/region/r/bucket/b/rebalance API.
2. Callbacks service calls RebalanceScheduler.
3. RebalanceScheduler checks current task state for the defined bucket.
4. RebalanceScheduler puts analysis task to queue if there is no ongoing rebalance for defined bucket at the moment.
5. BG service calls AnalyzerWorker API for bucket.
6. AnalyzerWorker updates redis table with state=analyze, with specified timeout interval.
7. After analysis is complete, AnalyzerWorker puts migration task(s) to queue.
8. BG service calls MigrationWorker API for bucket.
9. MigrationWorker updates redis table with state=migrate with timeout interval which is defined for HTTP API (polling from BG) sets records timeout to HTTP timeout*1.1.
10. MigrationWorker puts cleanup tasks to queue.
11. BG service calls CleanupWorker API for bucket+partition.
12. CleanupWorker updates redis table with state=cleanup.
13. After clean-up is complete, CleanupWorker updates redis table with state=none.

The particular bucket contents rebalancing steps given above, like those of other processes described herein, are presented by way of illustrative example only, and should not be construed as limiting in any way.

Another example of a buckets contents rebalancing process of the type described in conjunction with FIGS. 2, 3 and 4 will now be described with reference to various bucket contents tables, distribution tables and migration tables.

It is assumed in this example that a given one of the bucket contents tables for a particular one of the buckets of the database comprises a plurality of rows each associated with a different hash key. The given bucket contents table further comprises a plurality of columns each associated with multiple objects stored within the database. Each such object has a corresponding object key and is associated with a particular entry of the bucket contents table that includes metadata for that object. This is illustrated by a bucket contents table for a particular database bucket denoted "ark1" as follows:

| bucket | hash_key | key1 | key2 | key3 | ... |
|--------|----------|------|------|------|-----|
| ark1 | 1 | md_1 | md_2 | md_3 | ... |
| bucket | hash_key | key99 | key100 | key101 | ... |
| ark1 | 3 | md_1 | md_2 | md_3 | ... |
| bucket | hash_key | key200 | key201 | key202 | ... |
| ark1 | 5 | md_1 | md_2 | md_3 | ... |

The bucket contents rebalancing process rebalances the given bucket contents table using adaptive partitioning of object key ranges associated with respective rows of the given bucket contents table.

In the present example, this involves use of a distribution table that is representative of the given bucket contents table. The distribution table comprises rows corresponding to respective ones of the hash keys and a column denoting final ones of the object keys for respective ones of the object key ranges corresponding to respective ones of the hash keys. The distribution table includes all of the partition hash keys for the bucket along with the corresponding boundaries for these partitions. The distribution table is generally of the form [(last_key1, hash1), (last_key2, hash2), ... ]. All keys for which (last_key1<=key<last_key2) holds true should be stored with hash value hash2. The distribution table in some cases may contain additional hash key values which are used while writing to bucket contents during a bucket contents rebalancing process. The following is an example distribution table, in which the character UTF-8 denotes the "always last" character:

| bucket | last_key | hash | hash_write | comment |
|--------|----------|------|------------|---------|
| ark1 | ab | 1 | −1 | [ ... , 'ab') -> 1 |
| ark1 | fe | 4 | −1 | ['ab', 'fe') -> 4 |
| ark1 | zabc | 3 | −1 | ['fe', 'zabc') -> 3 |
| ark1 | <UTF-8 last> | 10 | −1 | ['zabc', ... ) -> 10 |

The bucket contents rebalancing process illustratively makes the new distribution as close as possible to an ideal distribution determined by the genetic algorithm, with as few changes as possible, while also supporting concurrent read and writes. For example, a write using the distribution table may involve determining the partition for a current object key, and writing using the corresponding hash key value ("hash") and hash_write value. A read using the distribution table may involve determining the partition for a current prefix, reading from the partition using its corresponding hash key value while the prefix stays within partition, and switching to the next partition and hash key value if the current partition is exhausted. Other types of write and read operations can be used.

The analyzer worker 330 implementing the genetic algorithm first determines a current distribution including a number of object keys for each partition, and attempts to determine an ideal distribution through splitting or merging of partitions. For example, in some embodiments, maximum and minimum numbers of object keys per partition may be established. In the case of a Cassandra database, the maximum number may be about 1,000,000 object keys per partition and the minimum number may be about 10,000 object keys per partition. An ideal distribution may include about 300,000 object keys per partition, such that each partition has a significant amount of room for growth.

The genetic algorithm implemented by the analyzer worker 330 attempts to find a suitable compromise between the competing goals of resizing all partitions to the ideal partition size and moving records between partitions as little as possible. This illustratively involves the use of a fitness function for a given partition as follows:

$$f(x) = \frac{|C - x|}{C + x} * D$$

where C denotes the ideal partition size, x denotes the size of the given partition, and D denotes the difference between the original and new distribution. An illustration of the difference calculations is shown in FIGS. 5A through 5M.

The genetic algorithm begins by creating an initial population of rebalancing plans. This is done by first obtaining the current distribution and then randomly merging smaller partitions and splitting larger partitions at random points in order to obtain the initial population of rebalancing plans.

Each rebalancing plan is considered a "genome" that is further processed by the genetic algorithm. During a breeding phase of the genetic algorithm, various mutations of the rebalancing plans are checked against the fitness function in order to determine the optimal modified distribution. The genetic algorithm continues until it obtains a rebalancing plan with a fitness value less than a configured value, or the fitness value does not significantly improve for a configured number of iterations. It should be recognized that when implementing the genetic algorithm one should take care to ensure that it does not inadvertently fall into a local minimum of the fitness function.

Assume by way of example that the distribution table for a given bucket prior to rebalancing of its bucket contents is as follows:

| bucket | last_key | hash | hash_write | comment |
|--------|----------|------|------------|---------|
| ark1 | ab | 1 | −1 | [ ... , 'ab') -> 1 |
| ark1 | fe | 2 | −1 | ['ab', 'fe') -> 2 |
| ark1 | fz | 3 | −1 | ['fe', 'fz') -> 3 |
| ark1 | kk | 4 | −1 | ['fz', 'kk') -> 4 |
| ark1 | no | 5 | −1 | ['kk', 'no') -> 5 |
| ark1 | pq | 6 | −1 | ['no', 'pq') -> 6 |
| ark1 | <UTF-8 last> | 0 | −1 | ['no', ... ) -> 0 |

Further assume that the particular rebalancing plan determined by the genetic algorithm is as follows:

1. Remove partition [ . . . , 'ab')→1, merge it into partition [ . . . , 'fe')→2.
2. Enlarge ['ab', 'fe')→2 so that ['ab', 'fe')→2 becomes [ . . . , 'fd')→2
3. Do not do anything with partition ['fe', 'fz')→3
4. Add partition ['ge', 'gz')→7.
5. Add partition ['gz', 'kk')→8.
6. Remove partition ['kk', 'no')→5, merge it into partition ['kk', 'pq')→6
7. Enlarge ['kk', 'pq')→6 so that ['kk', 'pq')→6 becomes ['kk', 'rs')→6

A visual representation of aspects of a rebalancing plan of the type described above is shown in FIGS. 6A through 6E.

After implementation of the particular rebalancing plan in the present example, the distribution table is as follows:

| bucket | last_key | hash | hash_write | comment |
|---|---|---|---|---|
| ark1 | ab | 1 | 2 | [ . . . , 'ab') -> 1 |
| ark1 | fe | 2 | -1 | ['ab', 'fe') -> 2 |
| ark1 | fd | 3 | 2 | ['fe', 'fd') -> 3 |
| ark1 | fz | 3 | -1 | ['fd', 'fz') -> 3 |
| ark1 | ge | 4 | -1 | ['fz', 'ge') -> 4 |
| ark1 | gz | 4 | 7 | ['ge', 'gz') -> 4 |
| ark1 | kk | 4 | 8 | ['gz', 'kk') -> 4 |
| ark1 | no | 5 | 6 | ['kk', 'no') -> 5 |
| ark1 | pq | 6 | -1 | ['no', 'pq') -> 6 |
| ark1 | rs | 0 | 6 | ['pq', 'rs') -> 6 |
| ark1 | <UTF-8 last> | 0 | -1 | ['rs', . . . ) -> 0 |

This is an intermediate state of the distribution table. Writes are still performed using the hash key and hash write values. Reads are similarly performed using the hash key values.

After the rebalancing plan is applied to the distribution table, the next step is to migrate the records to the new partitions as needed. This involves inserting the migrated records into partitions that are associated with different hash key values. All migrated records may be inserted with the same timestamp which is equal to the time of migration start in order to avoid race conditions that might otherwise arise in conjunction with deletion of migrated records. In the present example, the records are migrated in accordance with the following migration table:

| partition | from | to |
|---|---|---|
| [ . . . , 'ab') -> 1 | 1 | 2 |
| ['fe', 'fd') -> 3 | 3 | 2 |
| ['ge', 'gz') -> 4 | 4 | 7 |
| ['gz', 'kk') -> 4 | 4 | 8 |
| ['kk', 'no') -> 5 | 5 | 6 |
| ['kk', 'rs') -> 6 | 0 | 6 |

Implementation of the migration operations set forth in the migration table above results in the following modified distribution table:

| bucket | last_key | hash | hash_write | comment |
|---|---|---|---|---|
| ~~ark1~~ | ~~ab~~ | ~~1~~ | ~~2~~ | ~~[ . . . , 'ab') -> 1~~ |
| ~~ark1~~ | ~~fe~~ | ~~2~~ | ~~-1~~ | ~~['ab', 'fe') -> 2~~ |
| ark1 | fd | 2 | -1 | [ . . . , 'fd') -> 3 |
| ark1 | fz | 3 | -1 | ['fd', 'fz') -> 3 |
| ark1 | ge | 4 | -1 | ['fz', 'ge') -> 4 |
| ark1 | gz | 7 | -1 | ['ge', 'gz') -> 4 |
| ark1 | kk | 8 | -1 | ['gz', 'kk') -> 4 |
| ~~ark1~~ | ~~no~~ | ~~5~~ | ~~6~~ | ~~['kk', 'no') -> 5~~ |
| ~~ark1~~ | ~~pq~~ | ~~6~~ | ~~-1~~ | ~~['no', 'pq') -> 6~~ |
| ark1 | rs | 6 | -1 | ['kk', 'rs') -> 6 |
| ark1 | <UTF-8 last> | 0 | -1 | ['rs', . . . ) -> 0 |

Eliminating the deleted partitions gives the following version of the modified distribution table:

| bucket | last_key | hash | hash_write | comment |
|---|---|---|---|---|
| ark1 | fd | 2 | -1 | [ . . . , 'fd') -> 3 |
| ark1 | fz | 3 | -1 | ['fd', 'fz') -> 3 |
| ark1 | ge | 4 | -1 | ['fz', 'ge') -> 4 |
| ark1 | gz | 7 | -1 | ['ge', 'gz') -> 4 |
| ark1 | kk | 8 | -1 | ['gz', 'kk') -> 4 |
| ark1 | rs | 6 | -1 | ['kk', 'rs') -> 6 |
| ark1 | <UTF-8 last> | 0 | -1 | ['rs', . . . ) -> 0 |

A clean-up process is then performed which iterates over all deleted partitions and eliminates all records which lay in the boundaries of prev_partition_last_key and last_key and have a hash key value equal to that of the deleted partition.

It is to be appreciated that the particular advantages and other features described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™ or Vblock® converged infrastructure commercially available from VCE, the Virtual Computing Environment Company, an EMC Federation Company.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of storage system 106 and its database management system 110 comprising bucket contents rebalancer 114 are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, compute nodes, storage systems, databases and associated controllers. Also, the particular configurations of system and device elements and corresponding processing operations illustratively shown in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a storage system comprising a database; and
a controller associated with the storage system and configured:
to receive objects over a network;
to store the received objects in buckets of the database wherein each such bucket contains a plurality of objects stored within the database;
to maintain bucket contents tables for respective buckets of the database; and
responsive to a detected condition relating to a size restriction of a given one of the bucket contents tables, to perform rebalancing of the given bucket contents table;
the given bucket contents table comprising a plurality of rows each associated with a different hash key;
the given bucket contents table further comprising a plurality of columns each associated with multiple objects stored within the database;
each such object having a corresponding object key and being associated with a particular entry of the bucket contents table that includes metadata for that object;
wherein the controller is configured to perform the rebalancing of the given bucket contents table using adaptive partitioning of object key ranges associated with respective rows of the given bucket contents table;
wherein each row of the given bucket contents table meets the size restriction independent of a number of objects currently stored in the corresponding bucket; and wherein the controller is implemented by at least one processing device comprising a processor coupled to a memory.

2. The apparatus of claim 1 wherein the controller is implemented at least in part within the storage system.

3. The apparatus of claim 1 wherein the database comprises a distributed database implemented as a cluster of nodes.

4. The apparatus of claim 1 wherein the controller comprises a database management system having a bucket contents rebalancer module configured to implement the adaptive partitioning of the object key ranges.

5. The apparatus of claim 1 wherein the adaptive partitioning of the object key ranges utilizes a genetic algorithm.

6. The apparatus of claim 1 wherein the adaptive partitioning of the object key ranges analyzes a current distribution of object keys across the rows of the given bucket contents table and determines a new distribution of the object keys including at least one of adding one or more new rows to the given bucket contents table and deleting one or more existing rows from the given bucket contents table.

7. The apparatus of claim 1 wherein the controller is configured to maintain per-bucket activity counters for respective ones of a plurality of buckets of the database with each per-bucket activity counter counting a number of objects added to or removed from the corresponding bucket since a previous adaptive partitioning of its bucket contents table.

8. The apparatus of claim 7 wherein the adaptive partitioning is triggered for the given bucket contents table based at least in part on its corresponding per-bucket activity counter exceeding a specified threshold.

9. The apparatus of claim 1 wherein the controller is configured to perform an object migration process within the database in order to implement a new distribution of object keys across the rows of the given bucket contents table.

10. The apparatus of claim 9 wherein the controller is configured to perform a clean-up process on the given bucket contents table subsequent to completion of the object migration process.

11. The apparatus of claim 1 wherein the controller is configured to perform the rebalancing of the given bucket contents table using adaptive partitioning of object key ranges by splitting a single existing object key range into two or more new object key ranges, merging two or more existing object key ranges into a single new object key range, or by a combination of said splitting and merging.

12. The apparatus of claim 1 wherein the controller is configured to perform the rebalancing of the given bucket contents table using adaptive partitioning of object key ranges in a manner that preserves a sorted order of the object keys within the given bucket contents table.

13. The apparatus of claim 1 wherein the controller is configured to perform the rebalancing of the given bucket contents table using a distribution table that is representative of the given bucket contents table wherein the distribution table comprises rows corresponding to respective ones of a plurality of hash keys and a column denoting final ones of the object keys for respective ones of the object key ranges corresponding to respective ones of the plurality of hash keys.

14. The apparatus of claim 1 wherein the given bucket contents table has a specified maximum row size and can accommodate a number of objects that is one or more orders of magnitude greater than the specified maximum row size.

15. A method comprising:
receiving objects over a network;
storing the received objects in buckets of a database of a storage system wherein each such bucket contains a plurality of objects stored within the database;
maintaining bucket contents tables for respective buckets of the database; and
responsive to a detected condition relating to a size restriction of a given one of the bucket contents tables, rebalancing the given bucket contents table;
the given bucket contents table comprising a plurality of rows each associated with a different hash key;
the given bucket contents table further comprising a plurality of columns each associated with multiple objects stored within the database;
each such object having a corresponding object key and being associated with a particular entry of the bucket contents table that includes metadata for that object;
wherein the rebalancing of the given bucket contents table utilizes adaptive partitioning of object key ranges associated with respective rows of the given bucket contents table;
wherein each row of the given bucket contents table meets the size restriction independent of a number of objects currently stored in the corresponding bucket; and
wherein the method is performed by at least one processing device comprising a processor coupled to a memory.

16. The method of claim 15 wherein the adaptive partitioning of the object key ranges analyzes a current distribution of object keys across the rows of the given bucket contents table and determines a new distribution of the object keys including at least one of adding one or more new rows to the given bucket contents table and deleting one or more existing rows from the given bucket contents table.

17. The method of claim 15 further comprising:
maintaining per-bucket activity counters for respective ones of a plurality of buckets of the database with each per-bucket activity counter counting a number of objects added to or removed from the corresponding bucket since a previous adaptive partitioning of its bucket contents table; and
triggering the adaptive partitioning for the given bucket contents table based at least in part on its corresponding per-bucket activity counter exceeding a specified threshold.

18. A computer program product comprising a non-transitory processor-readable storage medium having stored therein program code of one or more software programs, wherein the program code when executed by at least one processing device causes said at least one processing device:
to receive objects over a network;
to store the received objects in buckets of a database of a storage system wherein each such bucket contains a plurality of objects stored within the database;
to maintain bucket contents tables for respective buckets of the database; and
responsive to a detected condition relating to a size restriction of a given one of the bucket contents tables, to rebalance the given bucket contents table;
the given bucket contents table comprising a plurality of rows each associated with a different hash key;
the given bucket contents table further comprising a plurality of columns each associated with multiple objects stored within the database;
each such object having a corresponding object key and being associated with a particular entry of the bucket contents table that includes metadata for that object;

wherein the rebalancing of the given bucket contents table utilizes adaptive partitioning of object key ranges associated with respective rows of the given bucket contents table; and wherein each row of the given bucket contents table meets the size restriction independent of a number of objects currently stored in the corresponding bucket.

19. The computer program product of claim 18 wherein the adaptive partitioning of the object key ranges analyzes a current distribution of object keys across the rows of the given bucket contents table and determines a new distribution of the object keys including at least one of adding one or more new rows to the given bucket contents table and deleting one or more existing rows from the given bucket contents table.

20. The computer program product of claim 18 wherein per-bucket activity counters are maintained for respective ones of a plurality of buckets of the database with each per-bucket activity counter counting a number of objects added to or removed from the corresponding bucket since a previous adaptive partitioning of its bucket contents table, and wherein the adaptive partitioning is triggered for the given bucket contents table based at least in part on its corresponding per-bucket activity counter exceeding a specified threshold.

* * * * *